(12) United States Patent
Hall et al.

(10) Patent No.: US 7,649,475 B2
(45) Date of Patent: Jan. 19, 2010

(54) TOOL STRING DIRECT ELECTRICAL CONNECTION

(76) Inventors: David R. Hall, 2185 S. Larsen Pkwy., Provo, UT (US) 84606; Scott Dahlgren, 2185 S. Larsen Pkwy., Alpine, UT (US) 84606

( * ) Notice: Subject to any disclaimer, the term of this patent is extended or adjusted under 35 U.S.C. 154(b) by 617 days.

(21) Appl. No.: 11/621,183

(22) Filed: Jan. 9, 2007

(65) Prior Publication Data

US 2008/0166917 A1    Jul. 10, 2008

(51) Int. Cl.
*G01V 3/00* (2006.01)
(52) U.S. Cl. .............. 340/854.9; 340/853.7; 340/853.1; 340/854.8; 439/191; 439/194; 336/132; 166/380
(58) Field of Classification Search .............. 340/854.9, 340/853.7, 854.8, 853.4, 853.1; 439/191, 439/194, 192; 336/132; 166/380
See application file for complete search history.

(56) References Cited

U.S. PATENT DOCUMENTS

| | | | |
|---|---|---|---|
| 2,000,716 A | 5/1935 | Polk | |
| 2,301,783 A | 11/1942 | Lee | |
| 2,414,719 A | 1/1947 | Cloud | |
| 3,253,245 A | 5/1966 | Brandt | |
| 3,967,201 A | 6/1976 | Rorden | |
| 4,012,092 A | 3/1977 | Godbey | |
| 4,039,237 A | 8/1977 | Cullen | |
| 4,176,894 A | 12/1979 | Godbey | |
| 4,416,494 A | 11/1983 | Watkins | |
| 4,591,226 A | 5/1986 | Hargett | |
| 4,660,910 A * | 4/1987 | Sharp et al. | 439/194 |
| 4,785,247 A | 11/1988 | Meador | |
| 4,806,928 A | 2/1989 | Vereruso | |
| 5,337,002 A | 8/1994 | Mercer | |
| 6,223,826 B1 | 5/2001 | Chau | |
| 6,367,564 B1 * | 4/2002 | Mills et al. | 175/40 |
| 6,392,317 B1 * | 5/2002 | Hall et al. | 307/90 |
| 6,402,524 B2 * | 6/2002 | Wurm et al. | 439/10 |
| 6,446,728 B2 | 9/2002 | Chau | |
| 6,511,335 B1 * | 1/2003 | Rayssiguier et al. | 439/191 |
| 6,551,755 B2 * | 4/2003 | Hidesaka et al. | 430/191 |
| 6,651,755 B1 | 11/2003 | Kelpe | |
| 6,655,464 B2 | 12/2003 | Chau | |
| 6,670,880 B1 | 12/2003 | Hall | |
| 6,717,501 B2 | 4/2004 | Hall | |
| 6,739,413 B2 | 5/2004 | Sharp | |
| 6,799,632 B2 | 10/2004 | Hall | |
| 6,821,147 B1 | 11/2004 | Hall | |

(Continued)

OTHER PUBLICATIONS

U.S. Appl. No. 11/133,905, filed May 21, 2005, Hall, David R.

*Primary Examiner*—Albert K Wong
(74) *Attorney, Agent, or Firm*—Tyson J. Wilde

(57) ABSTRACT

A downhole electrical transmission system having first and second tubular bodies coupled together by mating threads, each tubular body having a bore. An electrical conductor assembly is disposed within the bore of each tubular body. At least one end of each assembly has an electrical contact surrounded by a dielectric material, the electrical contact and dielectric material forming a polished, planar mating surface. The mating surfaces span an entire cross section of the end and are perpendicular to a central axis of the tubular bodies. The mating surfaces of each electrical conductor assembly are substantially engaged at a compressive load when the tubular bodies are fully mated.

20 Claims, 14 Drawing Sheets

U.S. PATENT DOCUMENTS

| | | |
|---|---|---|
| 6,830,467 B2 | 12/2004 | Hall |
| 6,844,498 B2 | 1/2005 | Hall |
| 6,845,822 B2 | 1/2005 | Chau |
| 6,888,473 B1 * | 5/2005 | Hall et al. ................. 340/854.4 |
| 6,913,093 B2 | 7/2005 | Hall |
| 6,929,493 B2 | 8/2005 | Hall |
| 6,945,802 B2 | 9/2005 | Hall |
| 6,968,611 B2 | 11/2005 | Hall |
| 7,028,779 B2 | 4/2006 | Chau |
| 7,114,970 B2 * | 10/2006 | Head .......................... 439/191 |
| 7,150,329 B2 | 12/2006 | Chau |
| 7,404,725 B2 * | 7/2008 | Hall et al. ................... 439/194 |
| 7,488,194 B2 * | 2/2009 | Hall et al. ................... 439/191 |
| 7,572,134 B2 * | 8/2009 | Hall et al. ................... 439/194 |
| 2004/0104797 A1 | 6/2004 | Hall |
| 2004/0113808 A1 | 6/2004 | Hall |
| 2004/0145492 A1 | 7/2004 | Hall |
| 2004/0150532 A1 | 8/2004 | Hall |
| 2004/0164833 A1 | 8/2004 | Hall |
| 2004/0164838 A1 | 8/2004 | Hall |
| 2004/0216847 A1 | 11/2004 | Hall |
| 2004/0244916 A1 | 12/2004 | Hall |
| 2004/0244964 A1 | 12/2004 | Hall |
| 2004/0246142 A1 | 12/2004 | Hall |
| 2005/0001735 A1 | 1/2005 | Hall |
| 2005/0001736 A1 | 1/2005 | Hall |
| 2005/0001738 A1 | 1/2005 | Hall |
| 2005/0035874 A1 | 2/2005 | Hall |
| 2005/0035875 A1 | 2/2005 | Hall |
| 2005/0035876 A1 | 2/2005 | Hall |
| 2005/0036507 A1 | 2/2005 | Hall |
| 2005/0039912 A1 | 2/2005 | Hall |
| 2005/0045339 A1 | 3/2005 | Hall |
| 2005/0046586 A1 | 3/2005 | Hall |
| 2005/0046590 A1 | 3/2005 | Hall |
| 2005/0067159 A1 | 3/2005 | Hall |
| 2005/0070144 A1 | 3/2005 | Hall |
| 2005/0082092 A1 | 4/2005 | Hall |
| 2005/0092499 A1 | 5/2005 | Hall |
| 2005/0093296 A1 | 5/2005 | Hall |
| 2005/0095827 A1 | 5/2005 | Hall |
| 2005/0115717 A1 | 6/2005 | Hall |
| 2005/0145406 A1 | 7/2005 | Hall |
| 2005/0150653 A1 | 7/2005 | Hall |
| 2005/0161215 A1 | 7/2005 | Hall |
| 2005/0173128 A1 | 8/2005 | Hall |
| 2005/0212530 A1 | 9/2005 | Hall |
| 2005/0236160 A1 | 10/2005 | Hall |
| 2005/0284662 A1 | 12/2005 | Hall |

* cited by examiner

TOOL STRING DIRECT ELECTRICAL CONNECTION

BACKGROUND OF THE INVENTION

The present invention relates to the field of data and/or power transmission. More specifically, it relates to the field of apparatus for transmitting data and/or power through such downhole tool strings.

Downhole tool strings have become increasingly versatile in the last half century. In addition to traditional oil, gas, and geothermic exploration and production purposes, tubular tool strings are often used for what is known as horizontal directional drilling to install underground power lines, communication lines, water lines, sewer lines, and gas lines. This sort of downhole drilling is particularly useful for boring underneath roadways, waterways, populated areas, and environmentally protected areas.

The increased versatility of downhole drilling with tool strings has led to a higher demand for apparatus that are able to transmit a power signal to downhole equipment as well as transmit data between downhole and surface tools. Hence, several different approaches to solving the problem of transmitting an electrical signal across the joints of a tool string have been developed and are known in the art.

U.S. Pat. Nos. 6,670,880; 6,983,485; and 6,939,493 to Hall, all of which are incorporated herein by reference for all that they disclose, teach of a system wherein tubular components are inductively coupled at threaded joints in the tool string. Other downhole telemetry systems are disclosed in U.S. Pat. No. 6,688,396 to Floerke et al and U.S. Pat. No. 6,641,434 to Boyle et al, which are also herein incorporated by reference for all that they contain.

Optimally, a system for transmitting electricity between surface equipment and downhole tools in a tool string should be transparent to the tool string operator or crew, as time delays introduced by a complicated telemetry system may represent a significant amount of money.

BRIEF SUMMARY OF THE INVENTION

In one aspect of the invention, a downhole electrical transmission system comprises first and second tubular bodies coupled together by mating threads, each tubular body comprising a bore. An electrical conductor assembly is disposed within the bore of each tubular body. At least one end of each assembly comprises an electrical contact surrounded by a dielectric material, the electrical contact and dielectric material forming a polished, planar mating surface. The mating surfaces of each electrical conductor assembly are substantially abutted at a compressive load (of perhaps at least 1000 psi) when the tubular bodies are fully mated, preferably 2500 psi. In some embodiments, the compressive load may be over 5,000 psi. The flat, polished mating surfaces may span the entire cross section of the ends of the electrical assembly and also be perpendicular to a central axis of the tubular bodies.

The electrical contacts may comprise a material selected from the group consisting of tungsten carbide, beryllium copper, cemented metal carbide, hardened steel, coppers, nickel, hard metal and combinations thereof. The dielectric material may comprise a material selected from the group consisting of alumina, ferrite, polycrystalline, diamond, carbon, and/or oxides of Mg, Al, Si, Yb, Ca, Be, Sr, Ns, Sm, Er, Eu, Sc, La, Gd, Dy, and Tm.

The mating surface may comprise a second, concentric electrical contact electrically isolated from the first electrical contact. The mating surface may be spring-loaded. At least one mating surface may be in a bore eccentric to the body.

The electrical conductor assembly may comprise a coaxial cable, a pair of twisted wires, a biaxial cable, a triaxial cable, insulated copper wires, or combinations thereof. The electrical conductor assemblies may comprise a stainless steel armoring. The stainless steel armoring may be flared on at least one end. Each electrical conductor assembly may be disposed within a collar mounted to an inner surface of the bore, one collar comprising a bearing surface adapted to rotationally slide with respect to the inner surface of one body and the other collar being rotationally fixed to the inner surface of the other body. A plurality of electrical conductor assemblies may be disposed within the bore of each tubular body. The electrical conductor assembly may be disposed adjacent a bore wall. The system may further comprise at least one seal intermediate the armoring and the dielectric material.

The tubular bodies may be selected from the group consisting of drill pipe, drill collars, subs, horizontal drill pipes, reamers, production pipe, injection pipe, upset drill pipe, and combinations thereof. At least one antenna may be attached to one of the tubular bodies and may be in electrical communication with the electrical conductor assembly.

In another aspect of the invention, an electrical transmission system may comprise a plurality of electrical conductor assemblies, each disposed within a bore of individual components of a downhole drill string. Each end of the assemblies may comprise an electrical contact surrounded by a dielectric material, the electrical contact and dielectric material forming a polished, planar surface. The mating surfaces of the electrical conductor assemblies may be substantially engaged at a compressive load of at least 1000 psi at mated interfaces of adjacent components. At least one antenna may be attached to a downhole component and may be in direct electrical communication with the plurality of electrical conductor assemblies, wherein the plurality of electrical conductor assemblies may also be in direct electrical communication with surface equipment.

The antenna may be selected from the group consisting of a dipole antenna, a whip antenna, a loop antenna, a magnetic loop antenna, and variations thereof. The system may further comprise at least one receiver attached to a downhole component. The surface equipment many be adapted to simultaneously transmit signals at different frequencies to the at least one antenna.

DETAILED DESCRIPTION OF THE INVENTION AND THE PREFERRED EMBODIMENT

Figure 1:
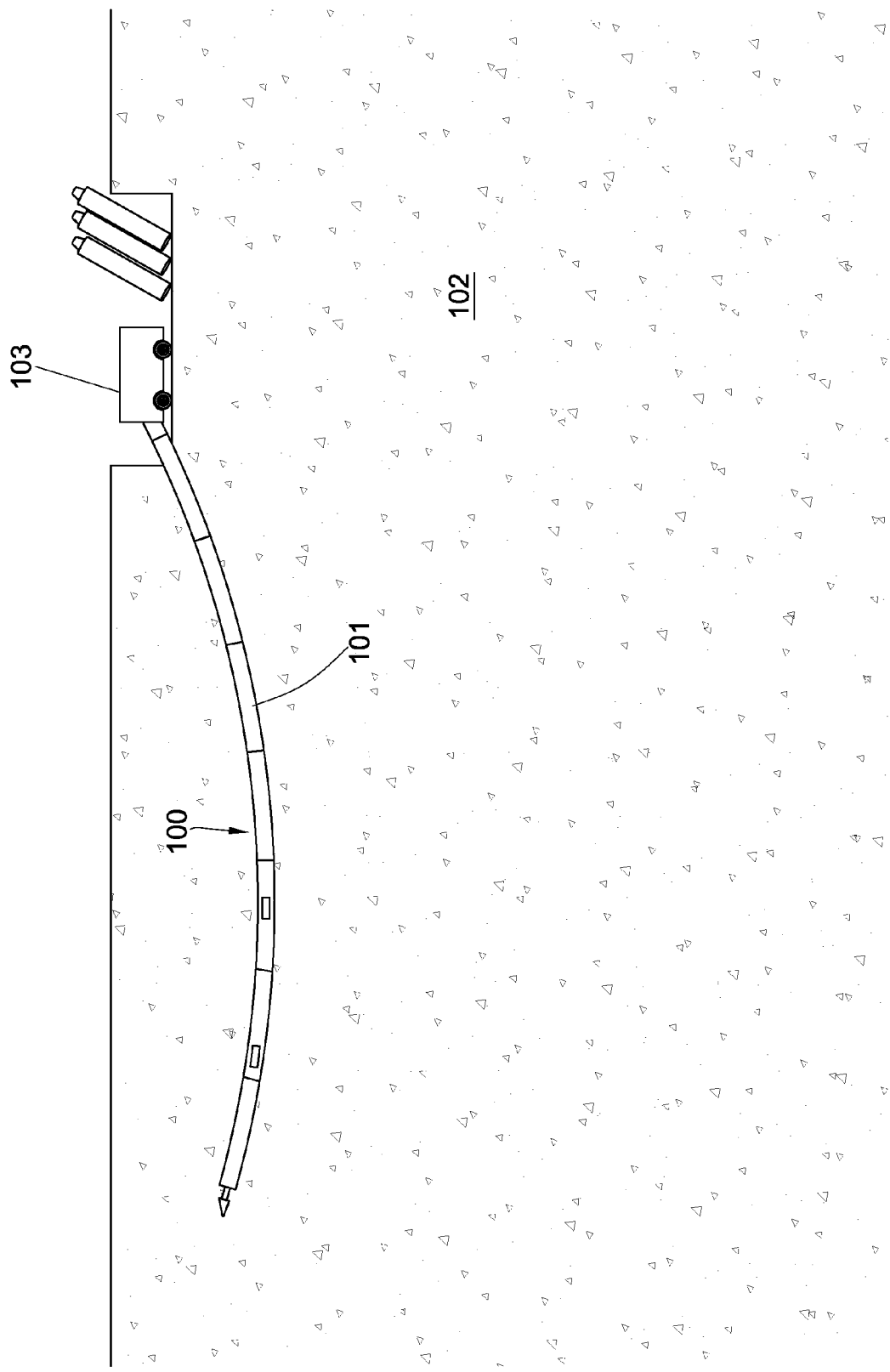
FIG. 1 is a cross-sectional diagram of an embodiment of a drill string in a horizontal drill well.

A drill string 100 may drill a bore hole 101 in subterranean formation 102 in a horizontal direction. In the embodiment of FIG. 1, a rig 103 is placed at the surface and is angled such that the drill string 100 penetrates the surface at a non-perpendicular angle. As the drill string 100 advances, the bore hole 101 gradually becomes generally parallel to the surface and then eventually returns to the surface at a predetermined location, at which time a back reamer may be attached to the drill string 100 and pulled back through the bore hole 101 in order to widen the hole for pipe and other tools to be inserted. Cables such as fiber optic or metal cables may also be attached to the drill string 100 as it is pulled back through the bore hole 101.

To accomplish horizontal directional drilling, the drill string 100 may comprise a steering mechanism. The steering mechanism may allow the drill string 100 to change direction while drilling, which may allow the drill string 100 to avoid known obstacles such as bodies of water or paved surfaces. Surface equipment, which may be part of the rig 103, may allow drill string operators to observe and manually control the direction of the bore hole 101.

Figure 2:
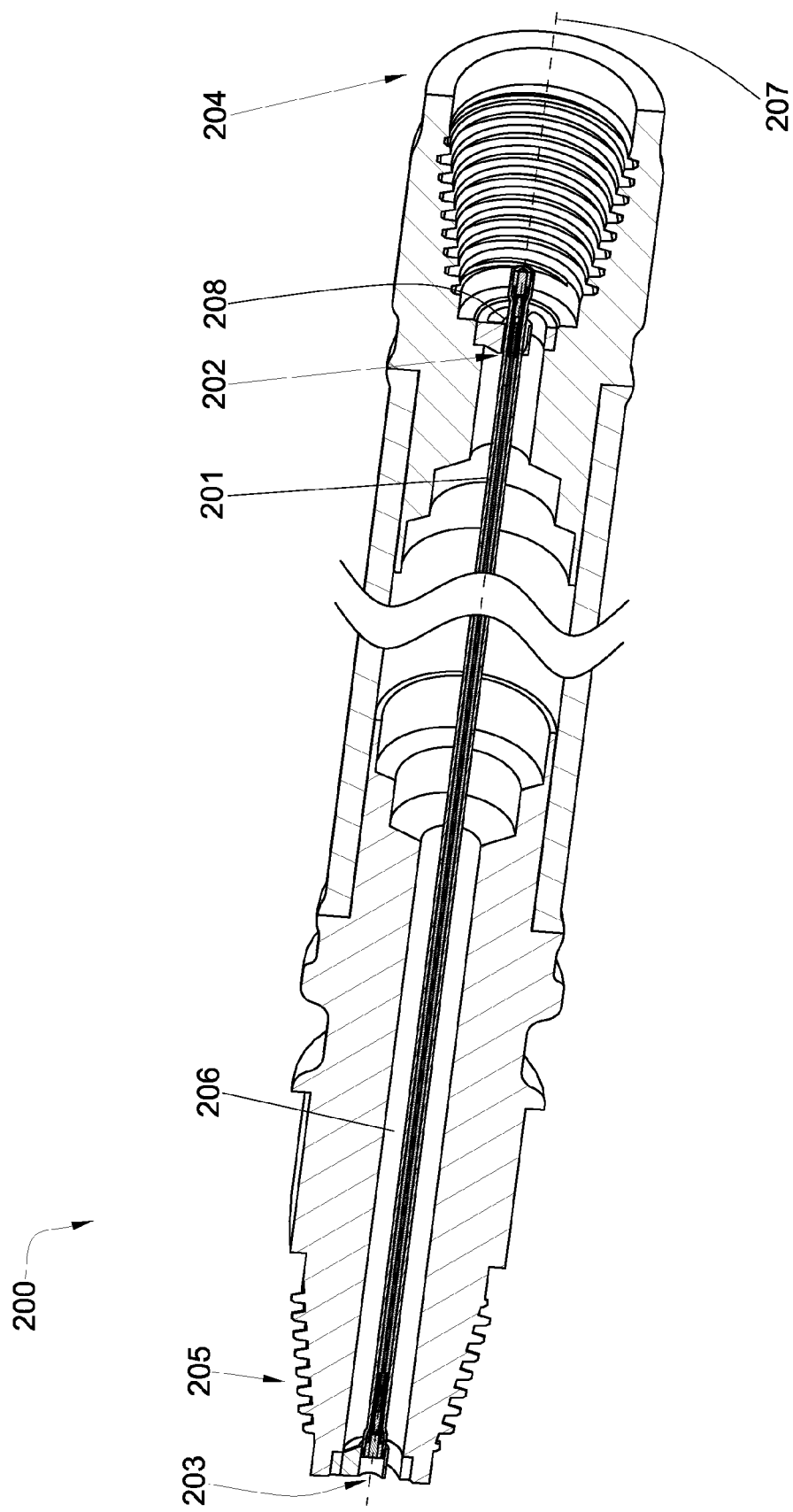
FIG. 2 is a cross-sectional diagram of an embodiment of an electrical conductor in a tubular body.
Figure 3:
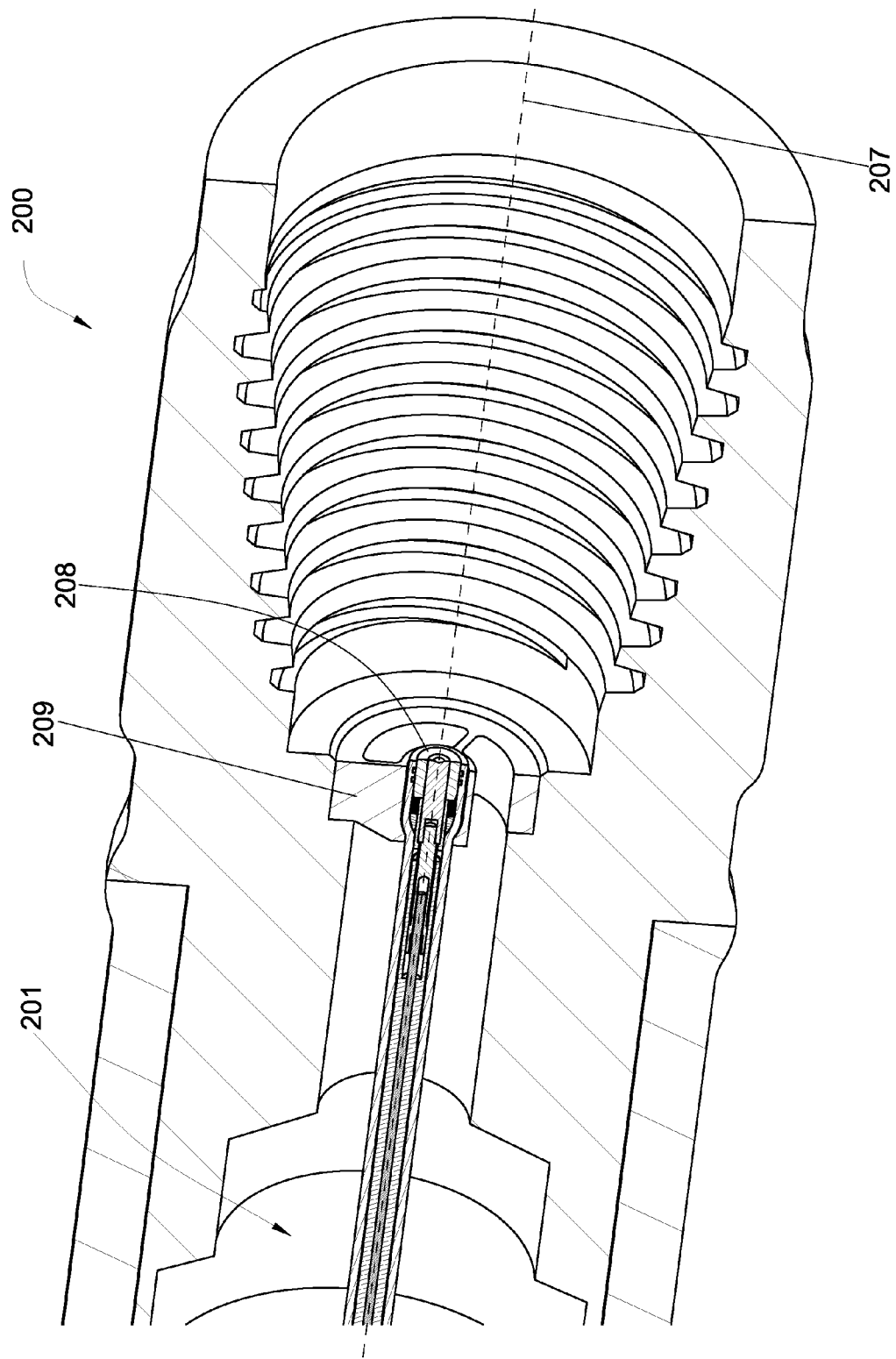
FIG. 3 is a cross-sectional diagram of an embodiment of an electrical conductor assembly in an end of a tool string component.

In order to provide power to downhole tools while drilling, the drill string 100 may comprise an electrical transmission system. Referring now to FIGS. 2 and 3, a tubular body 200 may comprise an electrical conductor assembly 201 with a first end 202 disposed within a first end 204 of the tubular body 200 and a second end 203 of the conductor assembly 201 may be disposed within a second end 205 of the tubular body 200. The tubular body 200 comprises a bore 206 having a central axis 207. The tubular body 200 shown is a drill pipe, but in other embodiments may be a drill collar, a sub, a horizontal drill pipe, a reamer, a production pipe, an injection pipe, a kelly, an upset drill pipe, or combinations thereof.

The electrical conductor assembly 201 may be disposed within the bore 206. The electrical conductor assembly 201 comprises a mating surface 208 which may engage with a similar mating surface in a separate tubular body. The electrical conductor assembly 201 may be configured to transmit an electrical signal, such as a power or data signal, from one end to another end. The electrical conductor assembly may 201 be substantially aligned at its end to the central axis 207 by a stabilizing element 209. By substantially aligning the electrical conductor assembly 201 to the central axis 207, another electrical conductor assembly in a second tubular body (see FIG. 5) aligned to the same axis may be coupled to the electrical conductor assembly 201 at the mating surface 208 to allow the transmission of the electrical signal from one tubular body to another. The stabilizing element 209 may be adapted to fit within a groove 300 of the tubular body 200.

Figure 4:
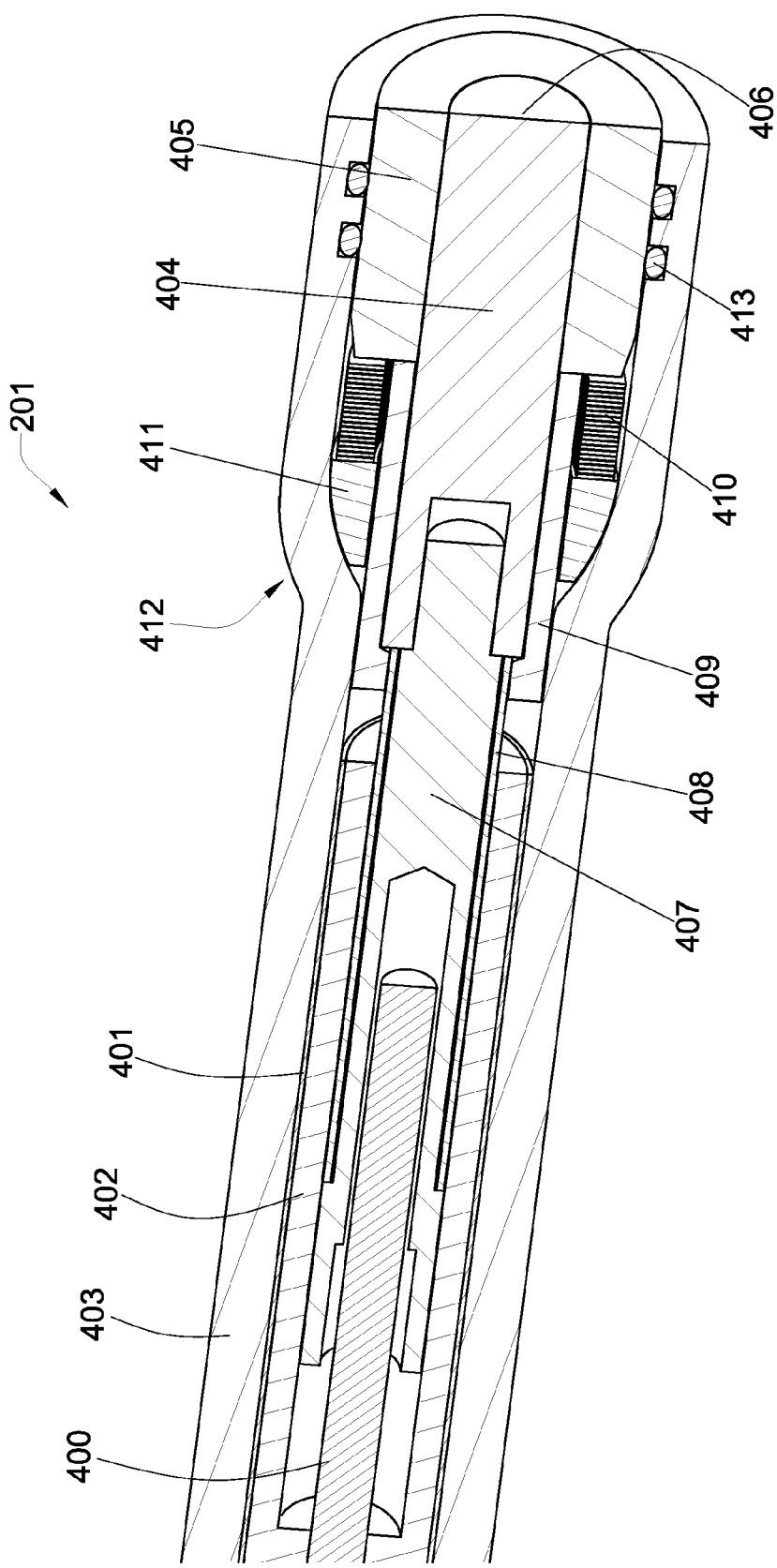
FIG. 4 is a cross-sectional diagram of an embodiment of an electrical conductor assembly.

Referring to FIG. 4, an electrical conductor assembly 201 may comprise a first electrical conductor 400 such as the inner conductor of a coaxial cable and a second electrical conductor 401 such as the outer conductor of the coaxial cable. The second conductor 401 is electrically isolated from the first conductor 400, in this case by an insulator 402 in the coaxial cable. In other embodiments, the first and second conductors 400, 401 may be part of a pair of twisted wires, a biaxial cable, a triaxial cable, insulated copper wires, or combinations thereof. The conductor assembly 201 may further comprise a stainless steel armoring 403. The armoring may protect the conductor assembly 201 from corrosive downhole fluids and/or mechanical damage.

The mating surface 208 of the electrical conductor assembly 201 may comprise an electrical contact 404 surrounded by a dielectric material 405. The contact 404 may comprise a material selected from the group consisting of tungsten carbide, beryllium copper, cemented metal carbide, hardened steel, copper, nickel, hard metal and combinations thereof. The dielectric material 405 may comprise a material selected from the group consisting of alumina, ferrite, polycrystalline diamond, carbon, and/or oxides of Mg, Al, Si, Yb, Ca, Be, Sr, Ns, Sm, Er, Eu, Sc, La, Gd, Dy, Tm, and combinations thereof. The mating surface 208 formed by the electrical contact 404 and the dielectric material 405 is a polished, planar surface. Under these conditions, when a particulate is caught intermediate two mating surfaces, it is believed that the particulate will be crushed or pushed out of the way due to the fact that the mating surfaces comprise material that is much harder than the particulate. The mating surface may comprise a dimple 406 for the accumulation of debris.

The first conductor 400 is in electrical communication with the electrical contact 404. An electrically conductive interface 407 may couple the first conductor 400 to the contact 404. The interface 407 may be covered by an electrical insulator 408 such as a heat shrink material. Additionally, a protective electrical insulator 409 may cover a portion of the contact 404 and interface 407 to prevent any short circuit between the inner conductor and the outer conductor. The first conductor 400 may be in electrical communication with a data or power source, which may be located at the surface or downhole, and the second conductor 401 may provide a return path through ground.

Resilient material 410 such as a plurality of wave springs, Belleville springs, coiled springs or combinations thereof may be disposed between the dielectric material 405 and a thrust shoulder 411 anchored against a flaring 412 of the stainless steel armoring 403. The flaring 412 may serve as an anchor for the conductor assembly 201 and may allow the conductor assembly 201 to have a larger diameter at the mating surface 208. The resilient material 410 may spring-load the mating surface 208 to allow a sufficient axial load in a mated connection as to permit good connectivity between the electrical contacts of two electrical conductor assemblies. The spring-load may comprise a compressive load of at least 1000 psi, preferably at least 2500 psi or more. Seals 413 such as o-rings may be disposed intermediate the armoring 403 and the dielectric material 405 to prevent undesirable fluids from entering the inner structure of the conductor assembly 201.

Figure 5:
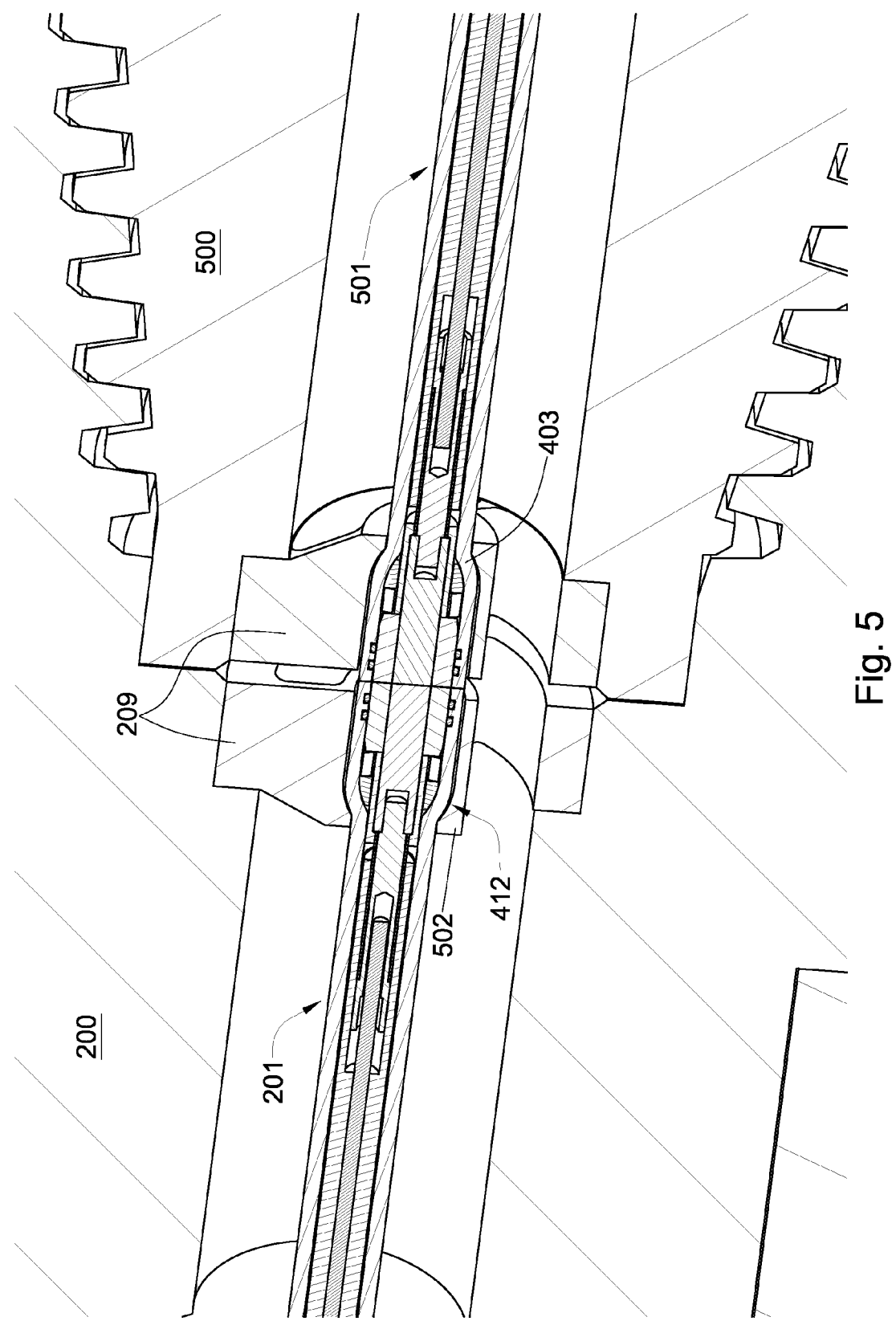
FIG. 5 is a cross-sectional diagram of an embodiment of mated electrical conductor assemblies in two tubular bodies.

By mating two tubular bodies 200, 500 together, as in the embodiment of FIG. 5, an electrical signal may be transmitted from one electrical conductor assembly 201 to another 501. The electrical conductor assemblies 201, 501 may have their mating surfaces sufficiently aligned by stabilizing elements 209 to allow electrical communication between the electrical contacts. The stabilizing elements 209 may be situated within annular grooves 300 of the tubular bodies 200, 500 and may anchor the conductor assemblies under an axial load. The stabilizing elements 209 may comprise shoulders 502 against which the flaring 412 of the armoring may rest. The axial load may be a result of holding the conductor assemblies in axial tension within the tubular component. The stainless steel armoring 403 may also shield the electrical signal as it passes from one electrical contact to the other. This provides the advantage of keeping the power and/or data signals clean and undistorted while they are traveling through the electrical conductor assemblies.

As the armoring 403 may be in electrical communication with the second conductor, the stabilizing elements 209 may be in electrical communication with their respective tubular bodies. Since the second conductor 401 is preferably tied to ground and the first and second tubular bodies 200, 500 may be in electrical communication with each other through their mechanical joint, an entire tool string may be connected to ground and may provide a good return path for an electrical signal transmitted through the first conductor 400, which may resolve solve floating ground issues.

Figure 6:
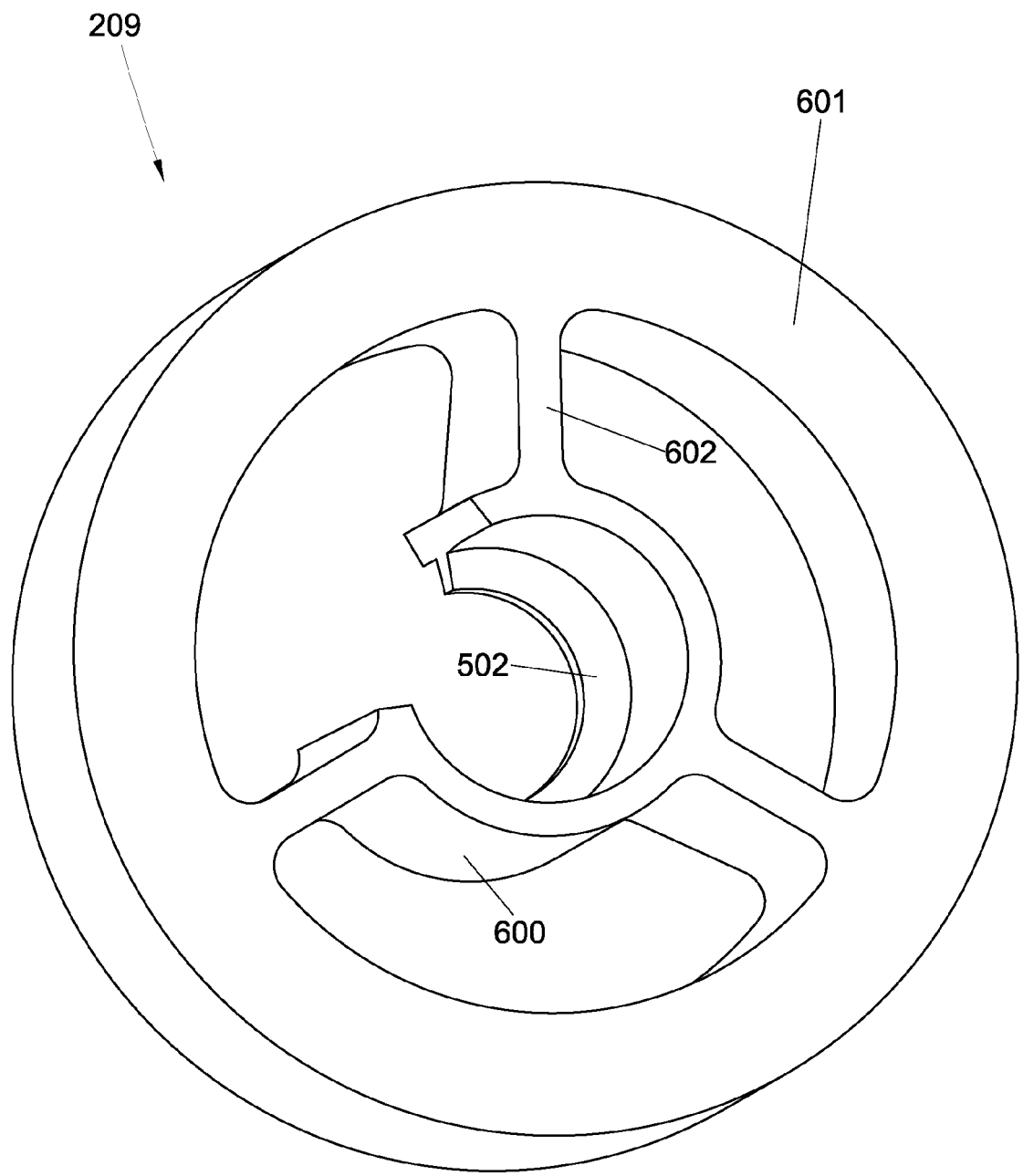
FIG. 6 is a perspective diagram of an embodiment of a stabilizing element.

Referring now to FIG. 6, the stabilizing element 209 may comprise a collar 600 designed to surround and attach directly to the electrical conductor assembly. As previously mentioned, the shoulder 502 is configured to hold the flaring of the armoring. An outer ring 601 may anchor the stabilizing element 209 inside of the tubular body. Fins 602 may connect the collar 600 to the outer ring 601 while permitting the passage of fluid through the stabilizing element 209. In other embodiments, the stabilizing elements 209 may comprise wave springs, rods, bristles, beads, blocks, whiskers, plates, or combinations thereof. A portion of the shoulder is removed for ease in securing the electrical conductor assembly in the stabilizing element.

Figure 7:
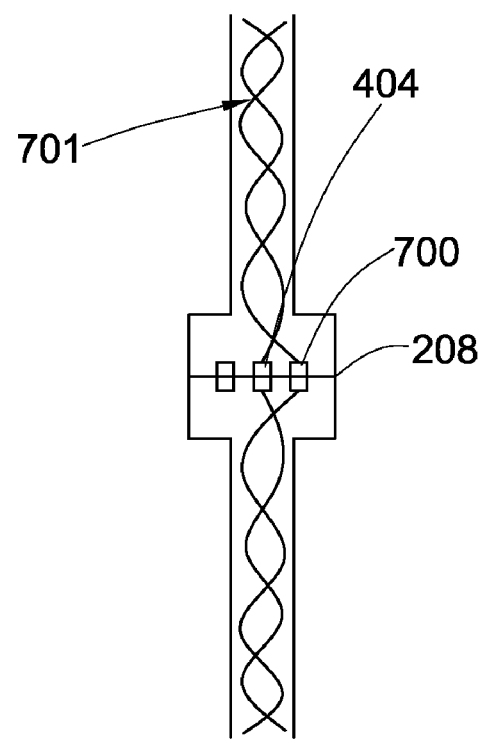
FIG. 7 is a cross-sectional diagram of an embodiment of mated electrical conductor assemblies.

Referring to FIG. 7, the mating surface 208 may comprise two electrical contacts 404, 700 connected to a twisted pair of wires 701. This configuration may allow for more shielding for the conductors such that they may be protected from corrosion, and it may also allow for more flexibility if the tubular body flexes or bends.

Figure 8:
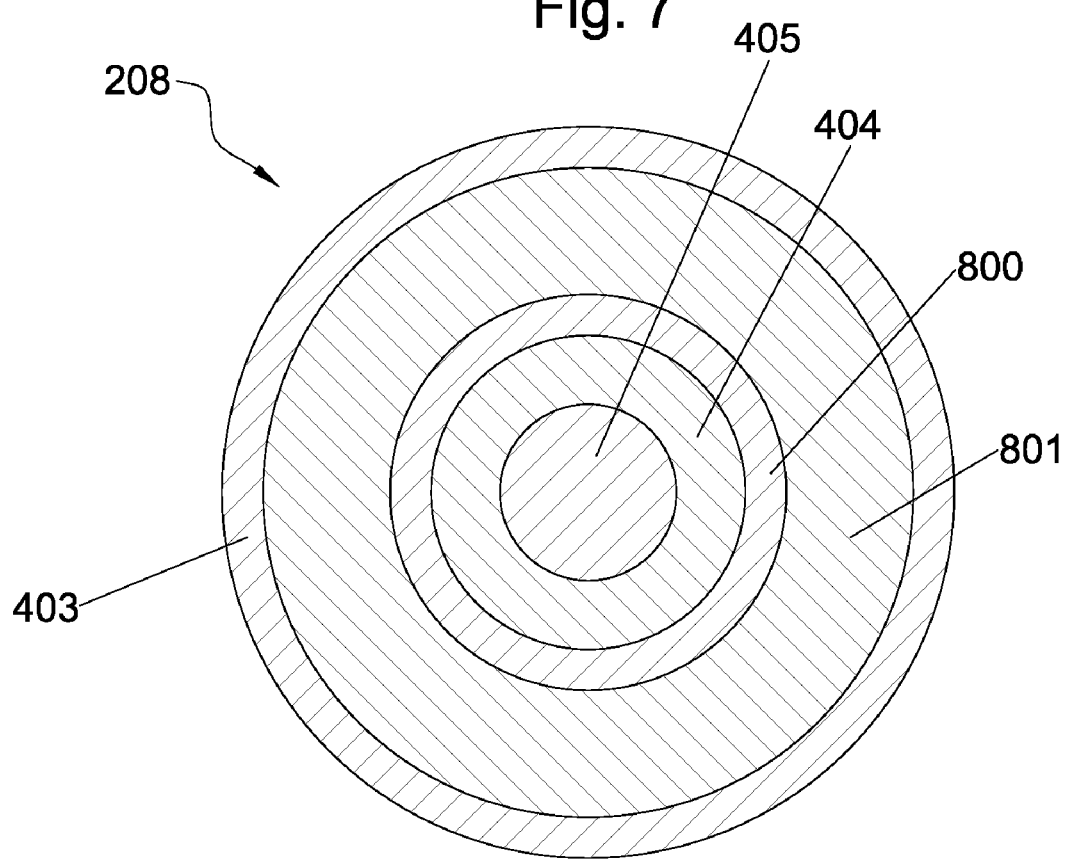
FIG. 8 is a cross-sectional diagram of another embodiment of an electrical conductor assembly.

As in the embodiment of FIG. 8, the mating surface 208 may comprise a plurality of electrical contacts. A first electrical contact 404 may be separated from a second electrical contact 800 by a first portion of dielectric material 405. A second portion of dielectric material 801 may surround the second electrical contact 800 to shield it from the armoring 403 or an outer casing which may provide an electrical path to ground. The first and second electrical contacts 404, 800 may be in electrical communication with each other to provide a backup signal transmission means. In other embodiments, they may be electrically isolated from each other which may allow for separate conductors to carry separate signals. Separate signals may be advantageous as they may allow for increased bandwidth or for individual power and data signals to be sent along different electrical paths. The embodiment of FIG. 8 may also be used with a triaxial cable, ribbion cable, or any type of cable with multiple electrical conductors.

Figure 9:
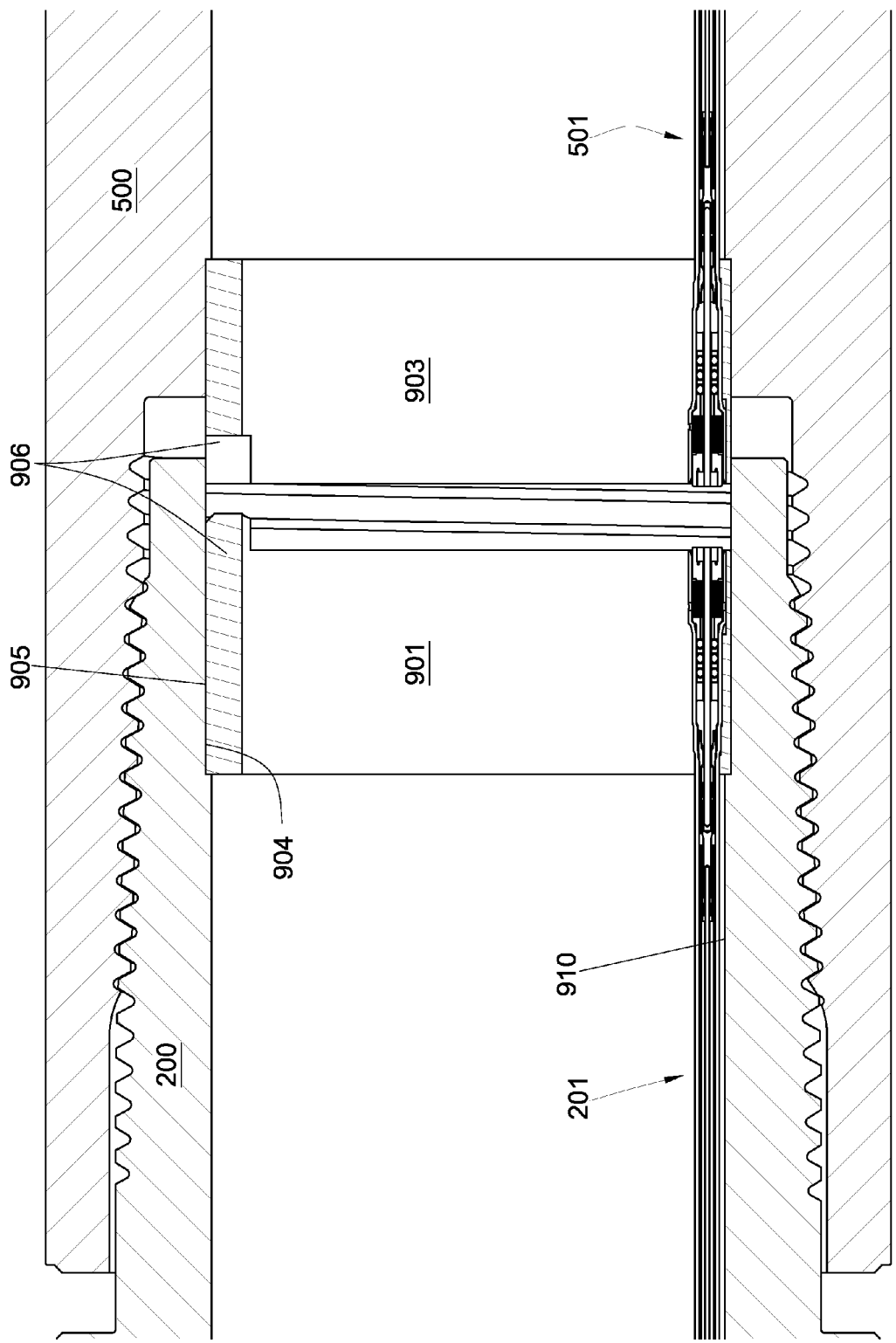
FIG. 9 is a cross-sectional diagram of another embodiment of electrical conductor assemblies in two tubular bodies.

Referring to FIG. 9, a portion of the electrical conductor assemblies 201, 501 may be disposed within collars in the bores 206 of the tubular bodies 200, 500. The pin end of a first tubular body 200 comprises a first collar 901 wherein the first conductor assembly 201 is secured, and the box end of the second tubular body 500 comprises a second collar 903 wherein the second conductor assembly 501 is secured. The first and second collars 901, 903 may be mounted to an inner surface 904 of the first and second tubular bodies 200, 500, respectively.

The first collar 901 may comprise an outer bearing surface 905 adapted to rotate with respect to the inner surface of the first tubular body 200, while the second collar 903 may be rotationally fixed to the inner surface of the second tubular body 500. The bearing surface 905 may comprise alumina, diamond, steel, silicon nitride, cubic boron nitride, ceramics, carbide, titanium, aluminum, chromium, or combinations thereof The bearing surface 905 may comprise a polished surface, which may allow the first collar 901 to slide while also providing wear protection for the collar. The second collar 903 may be keyed, glued, brazed, or press fit into the box end of the second tubular body 500 in order to keep it rotationally fixed to the inner surface.

Each collar comprises a key 906 complimentary to the other such that the key of the first collar 901 is adapted to interlock with the key of the second collar 903. When the keys are interlocked with each other, the collars become rotationally fixed to each other, and since the second collar 903 is rotationally fixed with respect to the inner surface of the second tubular body 500, the first collar 901 therefore becomes rotationally fixed with respect to the second tubular body 500. The first and second conductor assemblies 201, 501 are aligned within the collars such that when the collars become rotationally fixed with respect to each other, the conductor assemblies line up together while being disposed adjacent the bore walls 910. As the tubular bodies continue twisting together, the collars also come closer together, causing the conductors to come in contact with each other, establishing an electrical connection.

Figure 10:
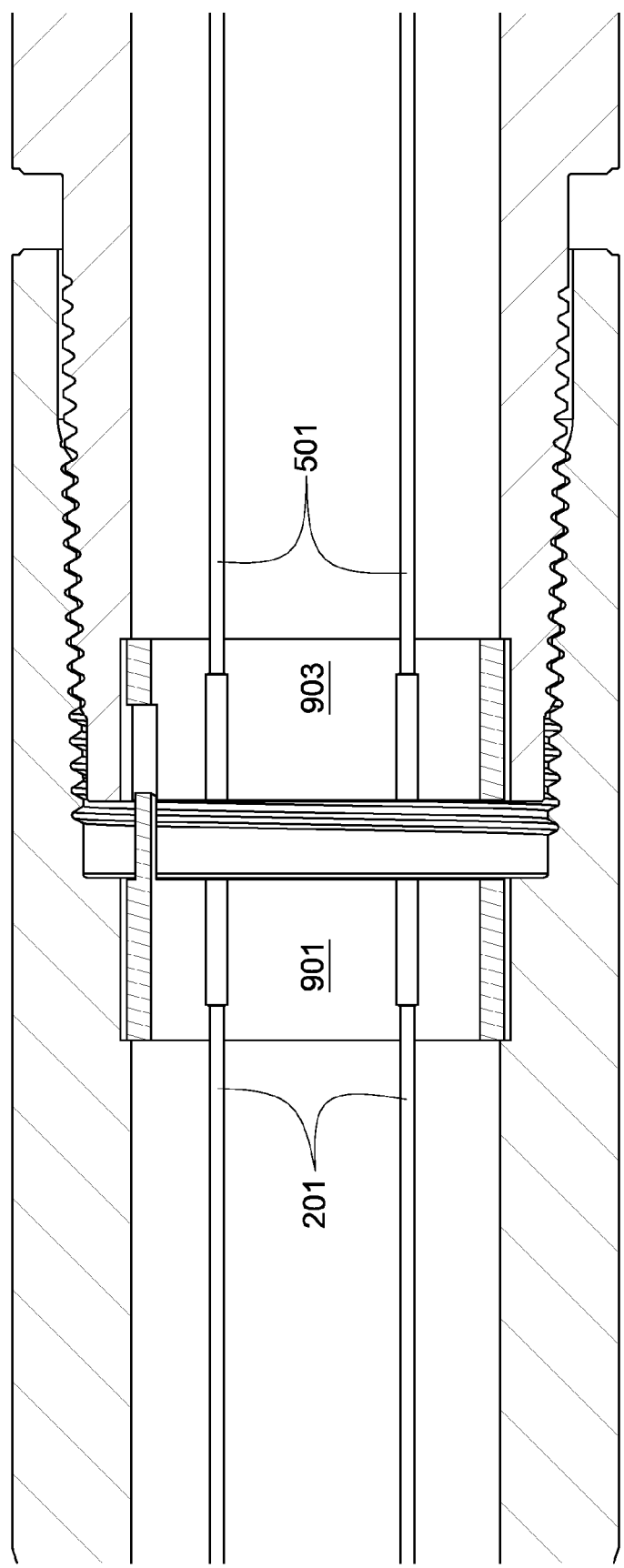
FIG. 10 is a cross-sectional diagram of an embodiment of a plurality of electrical assemblies in two tubular bodies.

The collars 901, 903 may comprise a plurality of electrical conductor assemblies 201, 501 disposed within individual slots formed in the inner diameter of the collar, as in the embodiment of FIG. 10. This may allow for separate data or power signals to be transmitted along each conductor assembly, which may be advantageous while transmitting signals with lower signal to noise ratios. The conductors may be spaced evenly apart such that they have a greatest amount of separation between them in order to reduce possible crosstalk between the conductor assemblies. A plurality of conductor assemblies may also be useful for ease of transmitting signals at different frequencies, if necessary.

Figure 11:
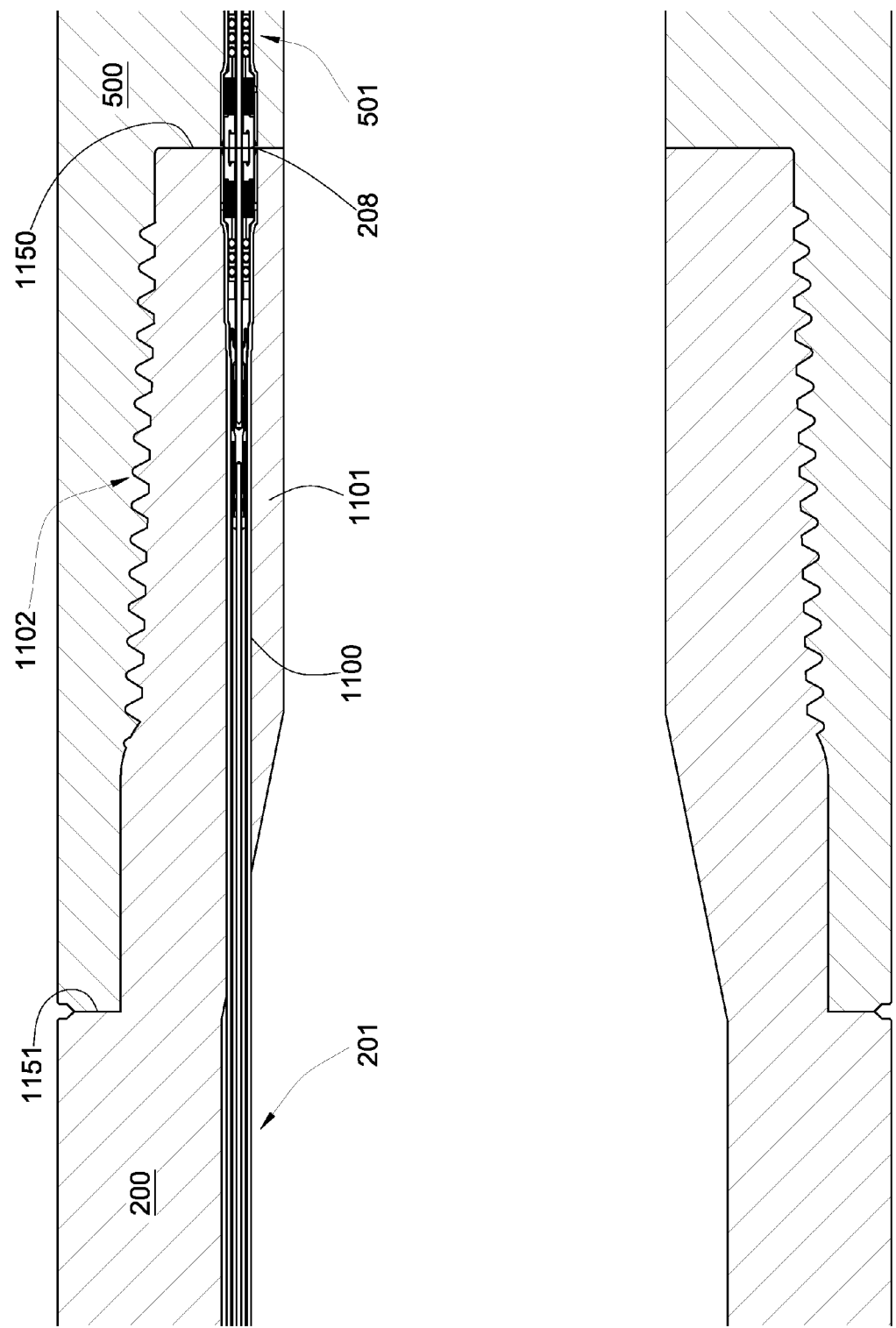
FIG. 11 is a cross-sectional diagram of another embodiment of mated electrical conductor assemblies in two tubular bodies.

Referring now to FIG. 11, at least one mating surface 208 may be disposed within a bore 1100 eccentric to the tubular body 200. The eccentric bore 1100 may be in the wall 1101 of the bore such that the mating surface of a first conductor assembly 201 in a first tubular body 200 is in contact with the mating surface of a second conductor assembly 501 in a second tubular body 500 in shoulders of the tubular bodies. The threaded ends of the tubular bodies may comprise timed threads 1102 such that the mating surfaces are mated when the tubular bodies are fully engaged. The eccentric bore may connect to the secondary, low-load bearing shoulder 1150, as shown in FIG. 11 or in other embodiments it may connect to a primary, high-load bearing shoulder 1151.

Figure 12:
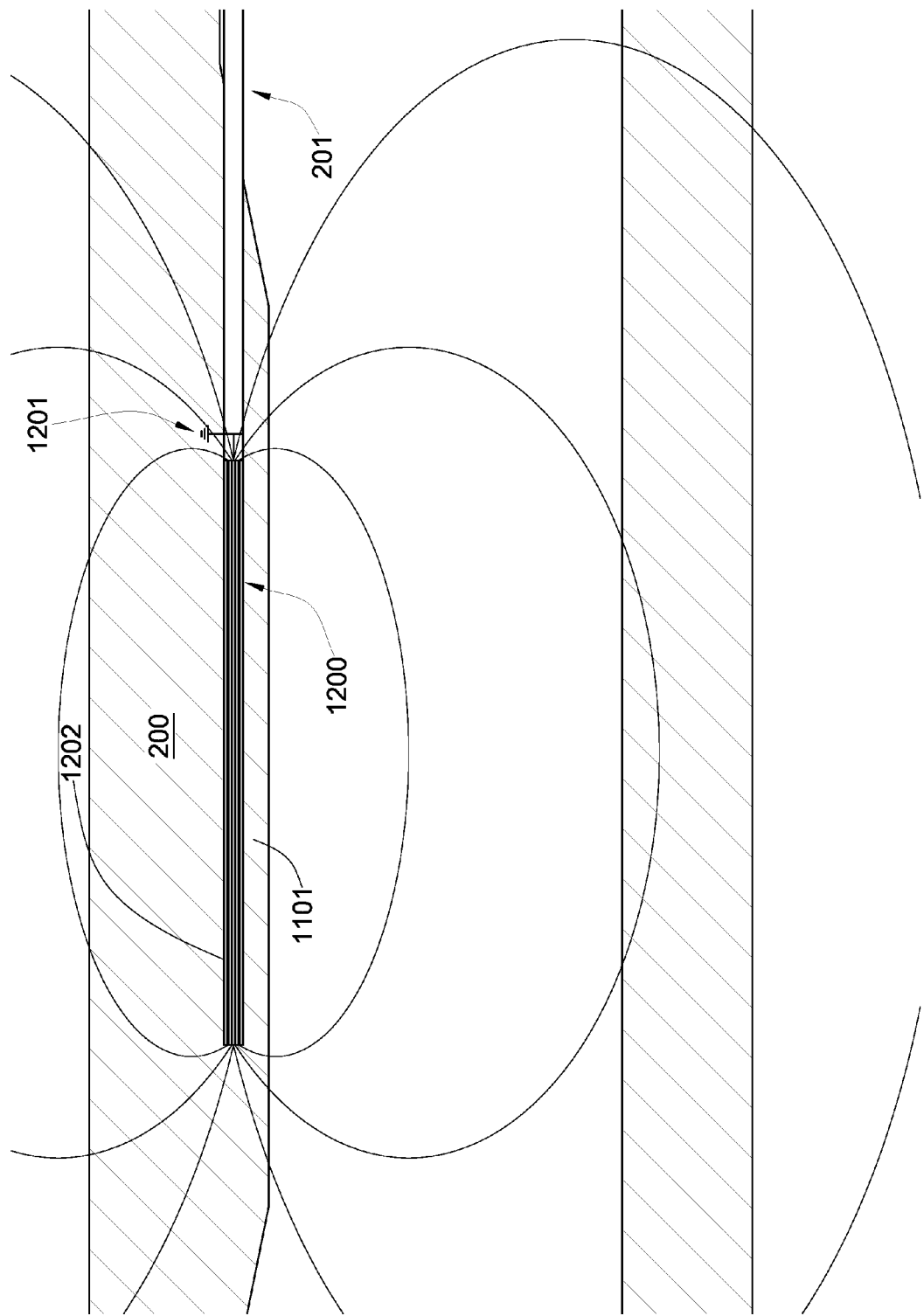
FIG. 12 is a cross-sectional diagram of an embodiment of an antenna in a tubular body.

At least one antenna 1200 may be attached to a tubular body 200 in the drill string, as in the embodiment of FIG. 12. The antenna 1200 is in electrical communication with the electrical conductor assembly 201 disposed within the tubular body 200, and transmits a signal received through the conductor assembly 201. The outer conductor of the conductor assembly may connected to ground 1201 through the tubular body 200 while the antenna 1200 is attached to the inner conductor of the conductor assembly 201. The antenna 1200 may be disposed within a recess 1202 in the bore wall 1101. In other embodiments, the antenna 1200 may be disposed within the bore or within a sleeve disposed around the tubular body 200. The antenna 1200 may be selected from the group consisting of dipole antenna, a whip antenna, a loop antenna, a magnetic loop antenna, and variations thereof.

A system of electrical transmission involving direct contact between drill string components is likely allow the signal to transmit farther into the bore hole than by other methods such as inductive coupling or the like. Attenuation of the signal in other methods from the surface to the antenna may not deliver a signal strong enough to penetrate the formation an adequate distance for detecting obstacles or for determining the position of the drill string.

Figure 13:
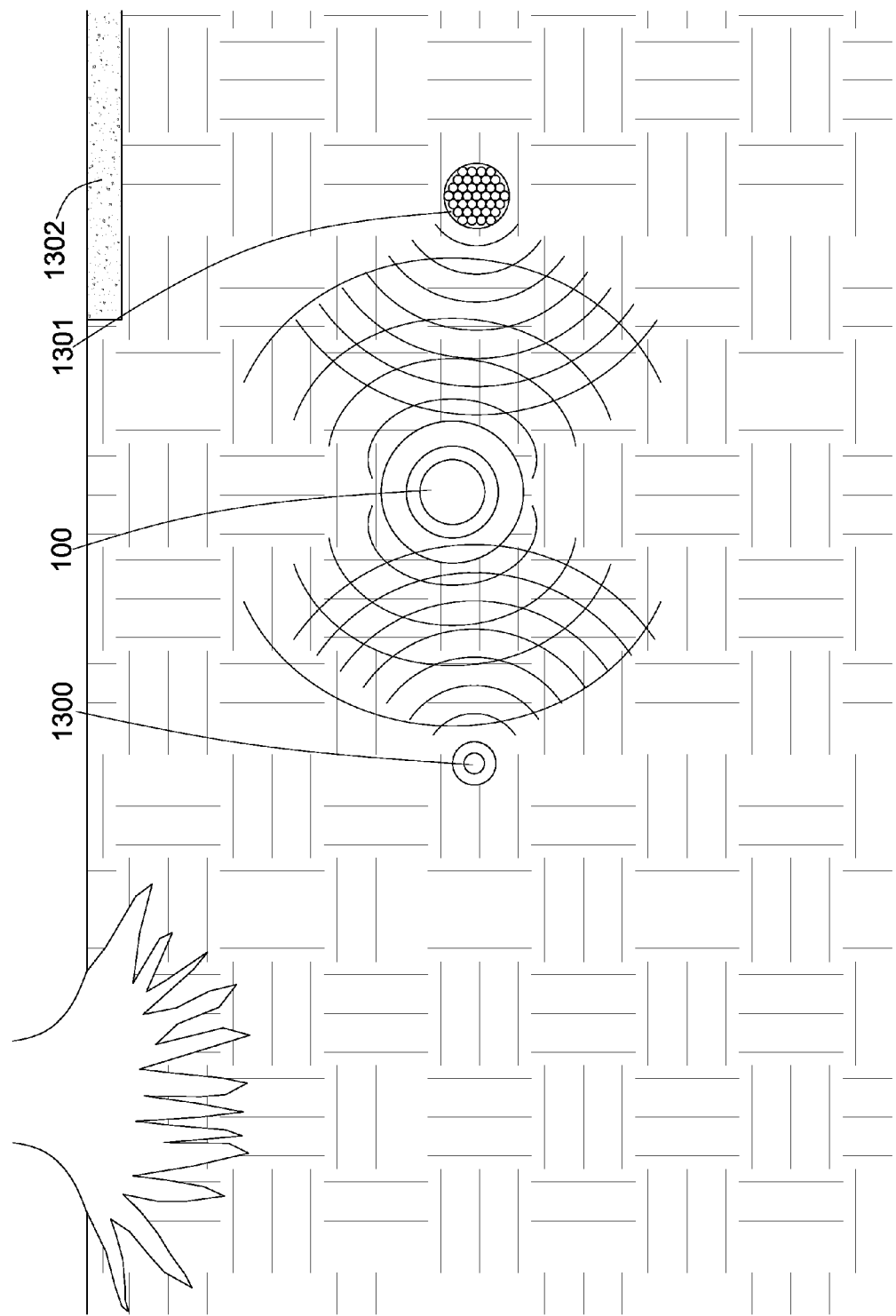
FIG. 13 is a cross-sectional diagram of another embodiment of a drill string in a horizontal drill well

Referring to FIG. 13, the antenna may be used to transmit a signal received from the surface equipment that is broadcast into the formation. As the signal reflects off of objects or different mediums in the formations—such as metal cables 1300, fiber optic cables 1301, or paved areas 1302 on the surface—the reflections may be detected by at least one receiver attached to the drill string. Properties of the received signal and the angle at which the reflections are received may aid in determining positions and physical properties of the objects. Depending on the type and orientation of the antenna used, the radiation pattern of the signal may be emitted perpendicular to, parallel to, or at any angle in relation to the direction of the drill string 100. A frequency swipe may be supplied from the surface to the antenna, so that a plurality of frequencies are sent into the formation. Different materials may respond better to certain frequencies than others, so that different types of materials may be identifiable. This may be advantageous because materials such as fiber optic cables or other materials that lack a high concentration of metal may be harder for traditional, prior art, sensing systems.

Figure 14:
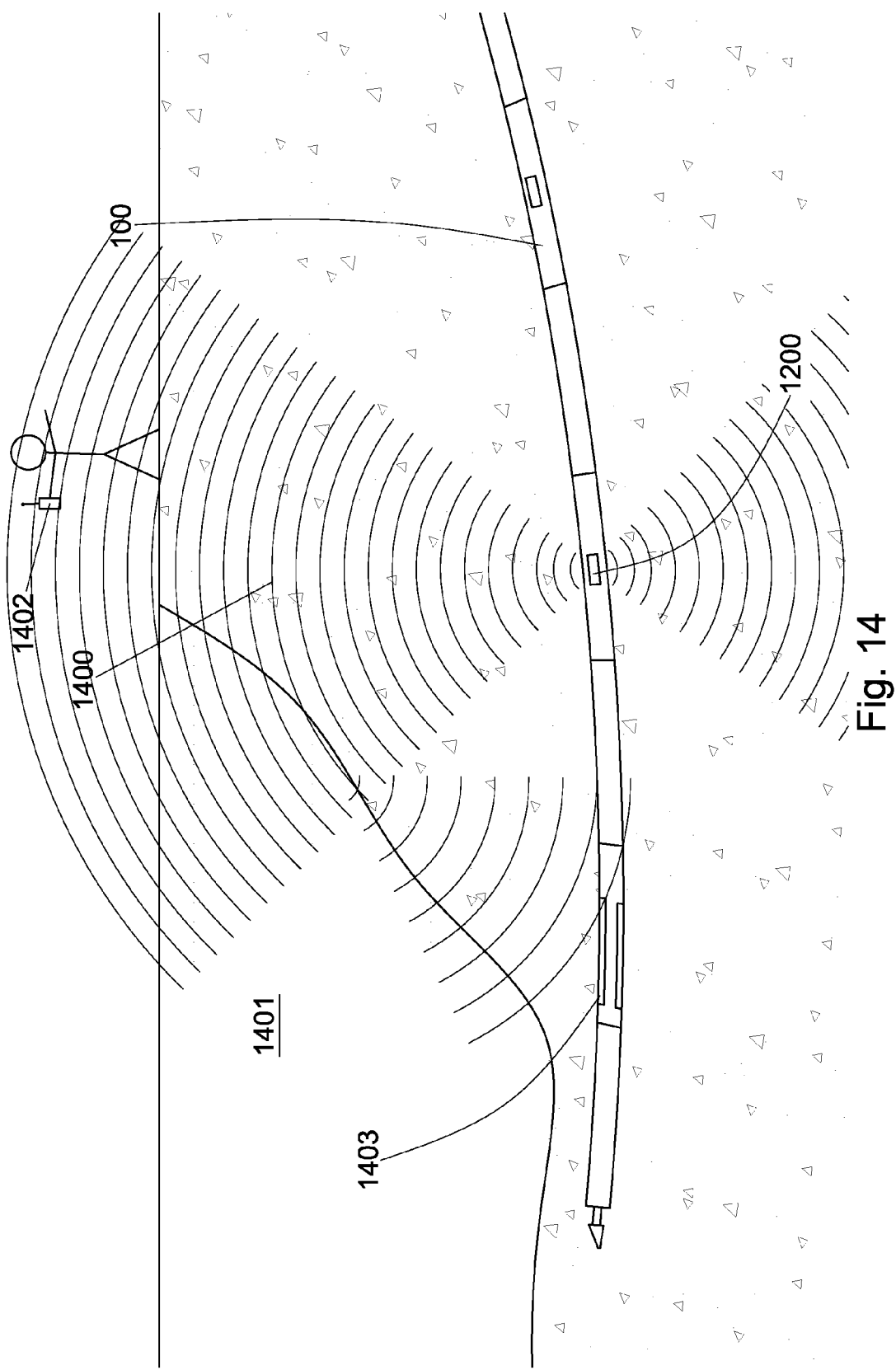
FIG. 14 is a cross-sectional diagram of another embodiment of a drill string in a horizontal drill well.

Referring to FIG. 14, a radiation pattern 1400 emitted from the antenna 1200 in a direction perpendicular to the direction of the drill string may allow operators to monitor distances between the drill string 100 and mediums 1401 such as bodies of water in order to assure that the bore hole is an adequate distance away to prevent collapsing or flooding of the bore hole. Receivers 1403 detect the reflected signals off of the mediums or obstacles and send the information to the surface equipment. A person on the surface may also use an RF receiver 1402 to detect the signal to determine the position of the drill string under the surface.

Figure 15:
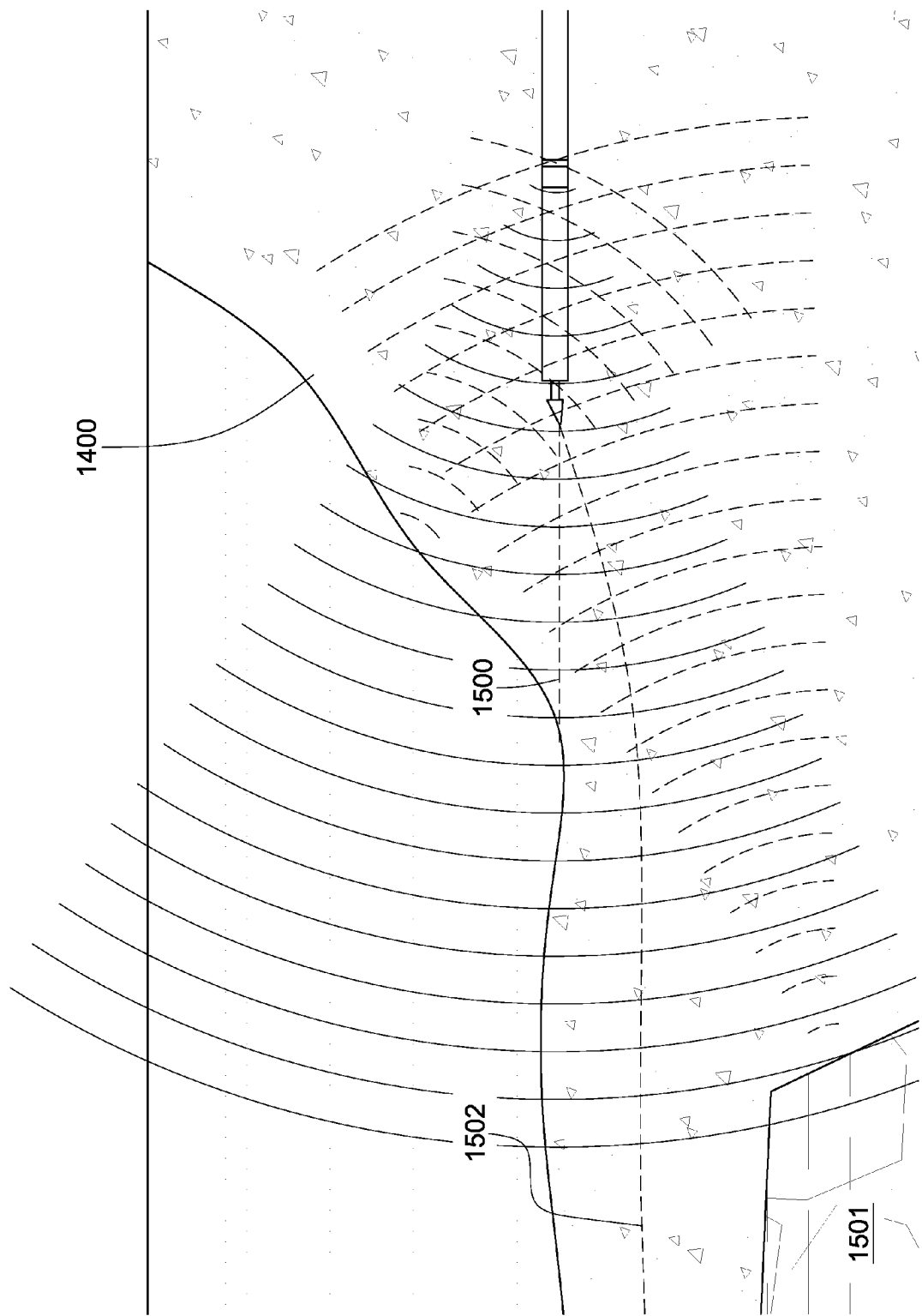
FIG. 15 is a cross-sectional diagram of another embodiment of a drill string in a horizontal drill well.

Referring to FIG. 15, a radiation pattern 1400 emitted in a direction parallel to the direction 1500 of the drill string may allow operators to detect objects 1501 in the path of the drill string that may slow or stop drilling, such as large rocks, hard formations, abrasive formations, corrosive formations, or bodies of water. The path of the drill string may then be directed in a new direction 1502 such that it avoids the obstacles.

Whereas the present invention has been described in particular relation to the drawings attached hereto, it should be understood that other and further modifications apart from those shown or suggested herein, may be made within the scope and spirit of the present invention.

What is claimed is:

1. A downhole electrical transmission system comprising:
   first and second tubular bodies coupled together by mating threads, each tubular body comprising a bore;
   an electrical conductor assembly disposed within the bore of each tubular body; and
   at least one end of each assembly comprising an electrical contact surrounded by a dielectric material, the electrical contact and dielectric material forming a polished, planar mating surface;
   the planar mating surface being spring-loaded by a resilient material;
   wherein the mating surfaces span an entire cross section of the end and are perpendicular to a central axis of the tubular bodies; and wherein the mating surfaces of each electrical conductor assembly are substantially abutted under a compressive load when the tubular bodies are fully mated.

2. The system of claim 1, wherein the electrical contacts comprise a material selected from the group consisting of tungsten carbide, beryllium copper, cemented metal carbide, hardened steel, copper, nickel, hard metal and combinations thereof.

3. The system of claim 1, wherein the dielectric material comprises a material selected from the group consisting of alumina, ferrite, polycrystalline diamond, carbon, and/or oxides of Mg, Al, Si, Yb, Ca, Be, Sr, Ns, Sm, Er, Eu, Sc, La, Gd, Dy, Tm, and combinations thereof.

4. The system of claim 1, wherein the mating surface comprises a second, concentric electrical contact electrically isolated from the first electrical contact.

5. The system of claim 1, wherein the electrical conductor assembly comprises a coaxial cable, a pair of twisted wires, a biaxial cable, a triaxial cable, insulated copper wires, or combinations thereof.

6. The system of claim 1, wherein the electrical conductor assemblies comprise a stainless steel armoring.

7. The system of claim 1, wherein the stainless steel armoring is flared on at least one end.

8. The system of claim 7, further comprising at least one seal intermediate the armoring and the dielectric material.

9. The system of claim 1, wherein the compressive load is at least 1,000 psi.

10. The system of claim 1, wherein each electrical conductor assembly is disposed within a collar mounted to an inner surface of the bore, one collar comprising a bearing surface adapted to rotationally slide with respect to the inner surface of one body and the other collar being rotationally fixed to the inner surface of the other body.

11. The system of claim 1, wherein a plurality of electrical conductor assemblies are disposed within the bore of each tubular body.

12. The system of claim 1, wherein the tubular bodies are selected from the group consisting of drill pipe, drill collars, subs, horizontal drill pipes, reamers, production pipe, injection pipe, upset drill pipe, and combinations thereof.

13. The system of claim 1, wherein the compressive load is at least 2,500 psi.

14. The system of claim 1, wherein at least one mating surface is in a bore eccentric to the body.

15. The system of claim 1, wherein the electrical conductor assembly is disposed adjacent a bore wall.

16. The system of claim 1, wherein at least one antenna is attached to one of the tubular bodies and is in electrical communication with the electrical conductor assembly.

17. An electrical transmission system comprising:
   a plurality of electrical conductor assemblies, each disposed within a bore of individual components of a downhole drill string;
   each end of the assemblies comprising an electrical contact surrounded by a dielectric material, the electrical contact and dielectric material forming a polished, planar surface;
   the planar mating surfaces of the electrical conductor assemblies being substantially engaged at a compressive load of at least 1000 psi at mated interfaces of adjacent components;
   the planar mating surface being spring-loaded by a resilient material; and
   at least one antenna attached to a downhole component and in direct electrical communication with the plurality of electrical conductor assemblies, wherein the plurality of electrical conductor assemblies is also in direct electrical communication with surface equipment.

18. The system of claim 17, wherein the antenna is selected from the group consisting of a dipole antenna, a whip antenna, a loop antenna, a magnetic loop antenna, and variations thereof.

19. The system of claim 17, further comprising at least one receiver attached to a downhole component.

20. The system of claim 17, wherein the surface equipment is adapted to simultaneously transmit signals at different frequencies to the at least one antenna.

* * * * *